(12) United States Patent
Inaba

(10) Patent No.: US 6,374,977 B1
(45) Date of Patent: Apr. 23, 2002

(54) DRUM SUPPORTING STRUCTURE FOR AUTOMOTIVE TRANSMISSION

(75) Inventor: Tetsuya Inaba, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/691,850

(22) Filed: Oct. 18, 2000

(30) Foreign Application Priority Data

Oct. 19, 1999 (JP) .......................................... 11-296508

(51) Int. Cl.$^7$ .......................... F16D 65/10; F16D 67/04; F16D 13/58
(52) U.S. Cl. ................................... 192/115; 192/85 AA
(58) Field of Search .............................. 192/115, 17 A, 192/221, 85 AA, 87.11, 87.12, 87.13, 87.14, 87.15, 87.16, 87.17, 87.18, 87.19; 475/116, 146, 311

(56) References Cited

U.S. PATENT DOCUMENTS

| | | | |
|---|---|---|---|
| 3,896,706 A | * | 7/1975 | Newstead et al. ............. 92/108 |
| 4,125,178 A | * | 11/1978 | Monks ...................... 192/12 C |
| 4,693,353 A | * | 9/1987 | Kobayashi et al. ......... 192/115 |
| 4,982,826 A | * | 1/1991 | Holbrook ................ 192/106 F |
| 5,483,850 A | | 1/1996 | Yamauchi ................. 74/606 R |

FOREIGN PATENT DOCUMENTS

| | | |
|---|---|---|
| DE | 74 00 787 | 7/1974 |
| DE | 36 44 875 | 9/1987 |
| DE | 44 05 823 | 6/2001 |
| JP | 57-184758 | * 11/1982 |
| JP | 61-38261 | 2/1986 |

* cited by examiner

*Primary Examiner*—Rodney H. Bonck
(74) *Attorney, Agent, or Firm*—Foley & Lardner

(57) ABSTRACT

A drum supporting structure in an automatic transmission has a drum support immovably installed in the transmission case. The drum support includes a cylindrical hollow shaft portion on which the drum is rotatably disposed and a circular wall portion which is concentrically and integrally formed on one end of the cylindrical hollow shaft portion. A first part of the circular wall portion is secured to the transmission case and has a plurality of hydraulic fluid passages defined therein, and a second, diametrically opposed part of the circular wall portion has a plurality of blind bores defined therein. The number of the blind bores is at least the same as that of the hydraulic fluid passages. With this arrangement, the circular wall portion and thus the drum supporting structure is able to have a well-balanced structure.

7 Claims, 10 Drawing Sheets

|  | C1 | C2 | C3 | B1 | B2 | B3 | B4 | F1 | F2 | F3 |
|---|---|---|---|---|---|---|---|---|---|---|
| 1st |  | (○)* |  |  | ● | (○) | ○ |  | △ | △ |
| 2nd |  |  | ○ |  | (○) | (○) | ○ |  | △ | △ |
| 3rd |  | ○ | ○ |  | (○) |  | ● | C | △ |  |
| 4th | ○ | ○ | ○ |  |  |  | ● | C |  |  |
| 5th | ○ | ○ |  |  | ○ |  | ● | C | C |  |
| Rev |  | ○ |  | ○ | ○ |  |  | △ | △ |  |

1st - GEAR

2nd - GEAR

3rd - GEAR

4th - GEAR

5th - GEAR

REVERSE - GEAR

DRUM SUPPORTING STRUCTURE FOR AUTOMOTIVE TRANSMISSION

BACKGROUND OF THE INVENTION

1. Field of the Invention

The present invention relates in general to automotive automatic transmissions, and more particularly to a drum supporting structure installed in the automatic transmission for rotatably supporting a drum on a drum support. More specifically, the present invention is concerned with drum supporting structures of a type which has a well-balanced construction throughout the entirety thereof to suppress undesired inclination thereof.

2. Description of the Prior

As is known, in an automotive automatic transmission, there is arranged a drum supporting structure that comprises a drum support on which a drum is rotatably supported. Within the drum, there is installed a hub, and between the drum and the hub, there is arranged a friction element. When the friction element is in ON (viz., engaged) condition, power transmission is carried out between the drum and the hub, while, when the friction element becomes OFF (viz., disengaged) condition, the power transmission is suppressed.

In order to clarify the task of the present invention, one conventional drum supporting structure will be described with reference to FIG. 15 of the accompanying drawings. The structure of the drawing is described in Japanese Patent First Provisional Publication 61-38261.

In FIG. 15, there is shown a rear view of a circular wall portion of a drum support 50 used in the drum supporting structure of the publication. As shown, a plurality of hydraulic fluid passages 52 are provided at a lower part of the circular wall portion of the drum support 50, which feed a hydraulic fluid to hydraulic fluid passages 54 provided at a central portion of the drum support. On an upper part of the circular wall portion of the drum support 50, there are integrally provided radially extending ribs 56 for reinforcement of that upper part. At a piston supporting portion 58, there is arranged a piston (not shown) of a friction element. Behind the piston, there is defined a fluid working chamber for the piston. Although not shown, a drum is coaxially and rotatably supported on a cylindrical hollow shaft portion of the drum support 50. (The entire construction of the drum support 50 is easily understood when referring to FIG. 14.)

However, the drum support 50 disclosed by the publication fails to exhibit a well balanced construction therethroughout due to an imbalanced arrangement of the structures such as the hydraulic fluid passages 52 and ribs 56 provided on the circular wall portion of the drum support 50. That is, in the drum support 50, the rigidity of the lower part of the circular wall portion is extremely different from that of the upper part of the same. As is known, if such ill-balanced drum support 50 is practically used in the transmission, undesired inclination of the drum support 50 relative to the bolted lower part tends to occur. This phenomenon becomes much severe when the lower part of the circular wall portion of the drum support 50 is secured to the transmission case by bolts 60, as shown.

SUMMARY OF THE INVENTION

It is therefore an object of the present invention to provide a drum supporting structure for an automotive automatic transmission, which is free of the above-mentioned drawback.

According to a first aspect of the present invention, there is provided a drum supporting structure for use in an automatic transmission including a transmission case, a drum rotatably installed in the transmission case and a friction element incorporated with the drum. The drum supporting structure comprises a drum support immovably installed in the transmission case, the drum support including a cylindrical hollow shaft portion on which the drum is rotatably disposed and a circular wall portion which is concentrically and integrally formed on one end of the cylindrical hollow shaft portion; a first part of the circular wall portion, the first part being secured to the transmission case and having a plurality of hydraulic fluid passages defined therein; and a second part of the circular wall portion, the second part having a plurality of blind bores defined therein, the number of the blind bores being at least the same as that of the hydraulic fluid passages, the first and second parts being provided at diametrically opposed portions of the circular wall portion and the blind bores extending toward the extension of the hydraulic fluid passages.

According to a second aspect of the present invention, there is provided a drum supporting structure for use in an automatic transmission including a transmission case, an output shaft rotatably installed the transmission case, a drum rotatably disposed around the output shaft, a first friction element incorporated with the drum and a second friction element arranged behind the drum. The drum supporting structure comprises a drum support immovably installed in the transmission case and having a through bore through which the output shaft passes, the drum support including a cylindrical hollow shaft portion on which the drum is rotatably disposed and a circular wall portion which is concentrically and integrally formed on one end of the cylindrical hollow shaft portion, the circular wall portion having a rear surface that faces the second friction element; a first part of the circular wall portion, the first part being bolted to the transmission case and having a plurality of hydraulic fluid passages defined therein; and a second part of the circular wall portion, the second part having a plurality of blind bores defined therein, the number of the blind bores being at least the same as that of the hydraulic fluid passages, the first and second parts being provided at diametrically opposed portions of the circular wall portion and the blind bores extending the extension of the hydraulic fluid passages.

BRIEF DESCRIPTION OF THE DRAWINGS

Other objects and advantages of the present invention will become apparent from the following description when taken in conjunction with the accompanying, in which.

DETAILED DESCRIPTION OF THE INVENTION

Figure 1:
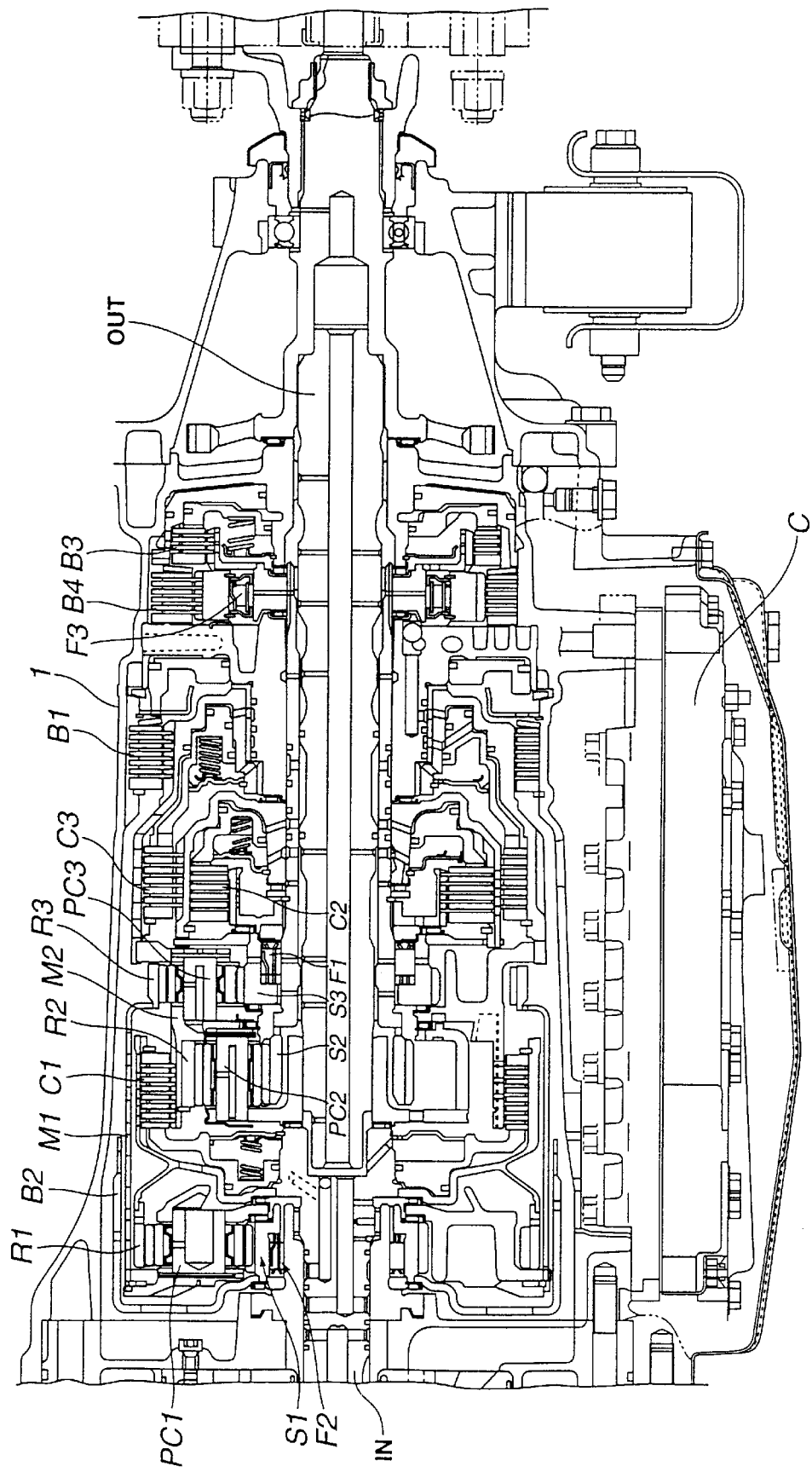
FIG. 1 is a sectional view of an automotive automatic transmission to which the present invention is practically applied.

In the following, the detail of the present invention will be described with reference to the accompanying drawings.

For ease of understanding, various directional terms, such as, right, left, upper, lower, rightward, leftward and the like are used in the following description. However, such terms are to be understood with respect to the drawing or drawings on which the corresponding part or portion is illustrated.

Figures 2, 3:
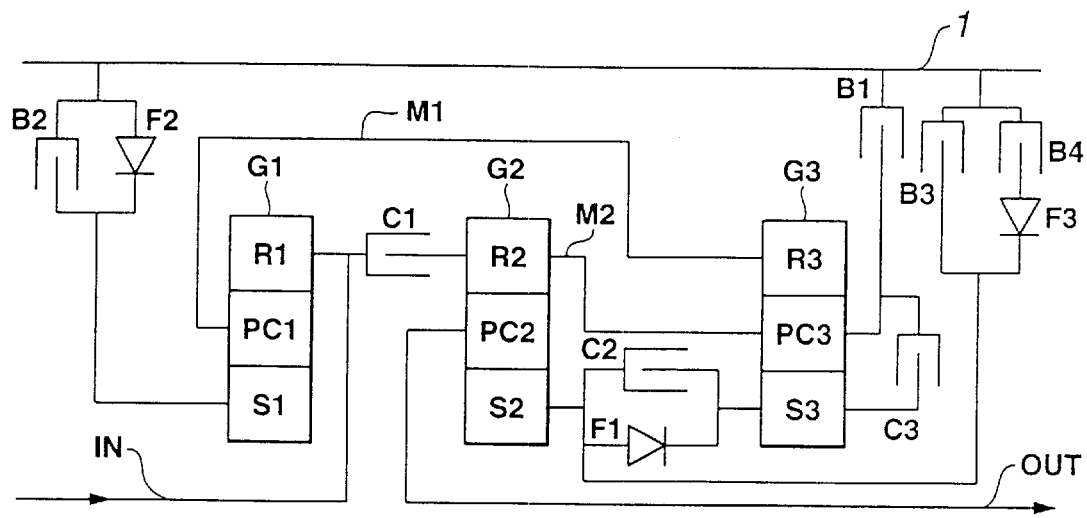
FIG. 2 is a schematic illustration of power train provided by the automatic transmission to which the present invention is practically applied.
FIG. 3 is table showing various conditions taken by various friction elements used in the automatic transmission to which the invention is practically applied.
Figure 4:
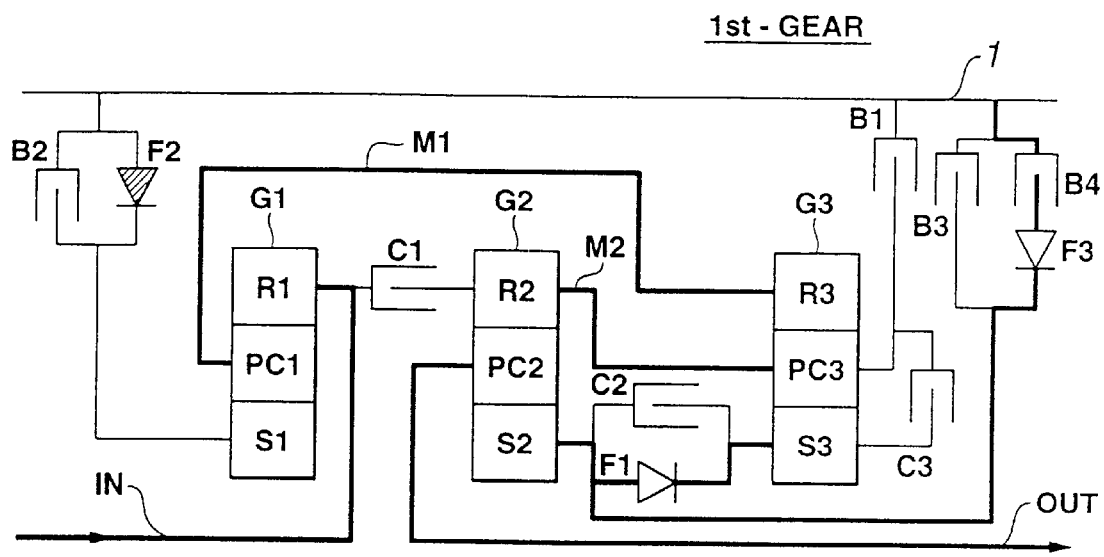
FIG. 4 is a view similar to FIG. 2, but showing a torque transmission path that is established when the automatic transmission assumes First-Gear.
Figure 5:
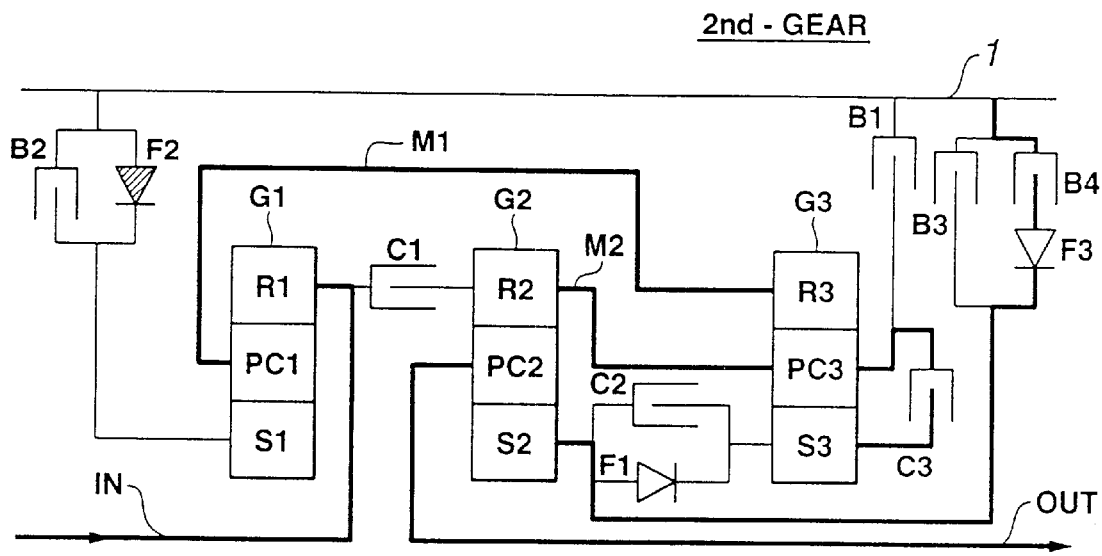
FIG. 5 is a view similar to FIG. 2, but showing a torque transmission path that is established when the automatic transmission assumes Second-Gear.
Figure 6:
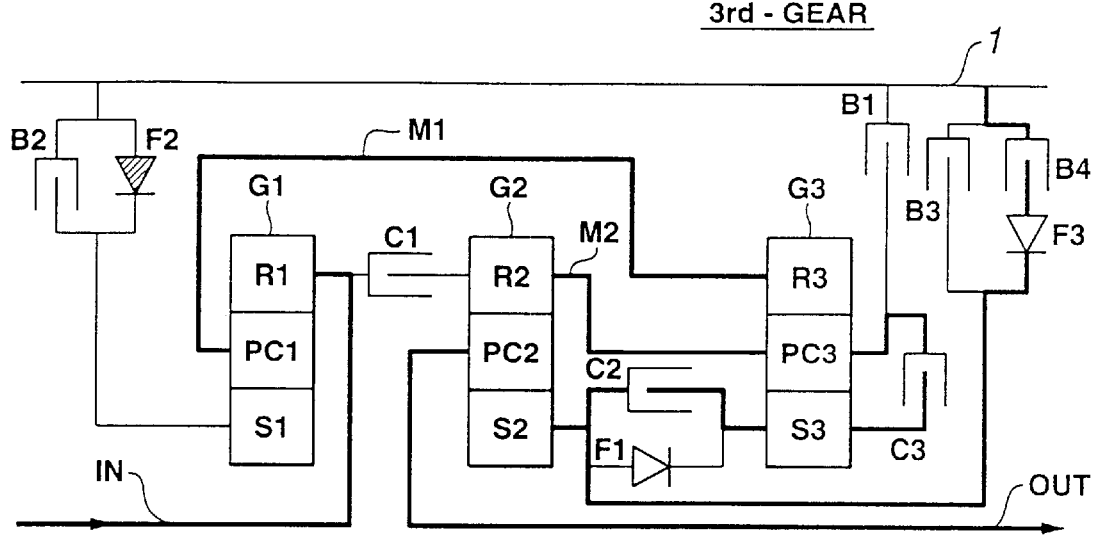
FIG. 6 is a view similar to FIG. 2, but showing a torque transmission path that is established when the automatic transmission assumes Third-Gear.
Figure 7:
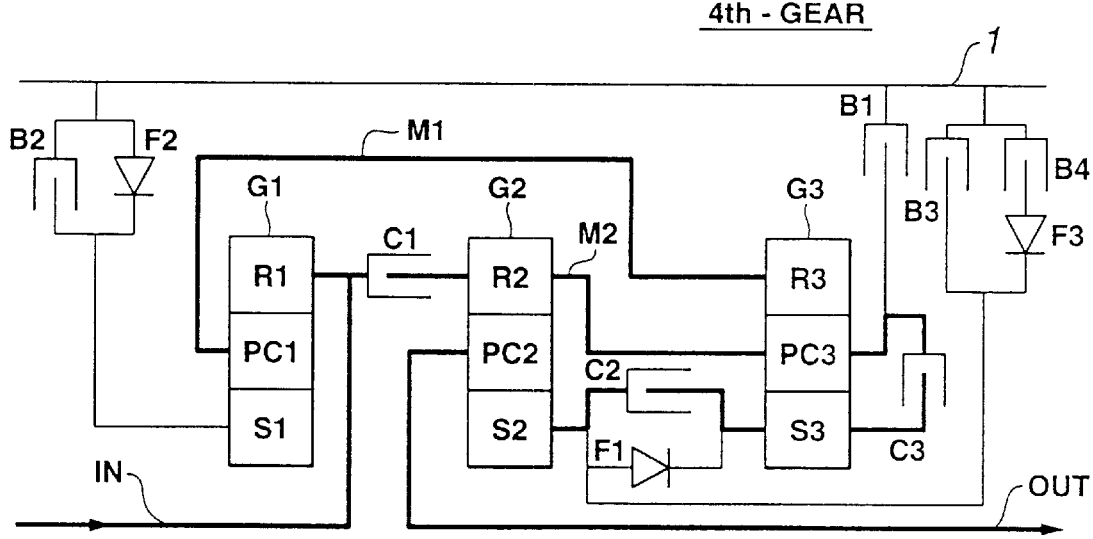
FIG. 7 is a view similar to FIG. 2, but showing a torque transmission path that is established when the automatic transmission assumes Fourth-Gear.
Figure 8:
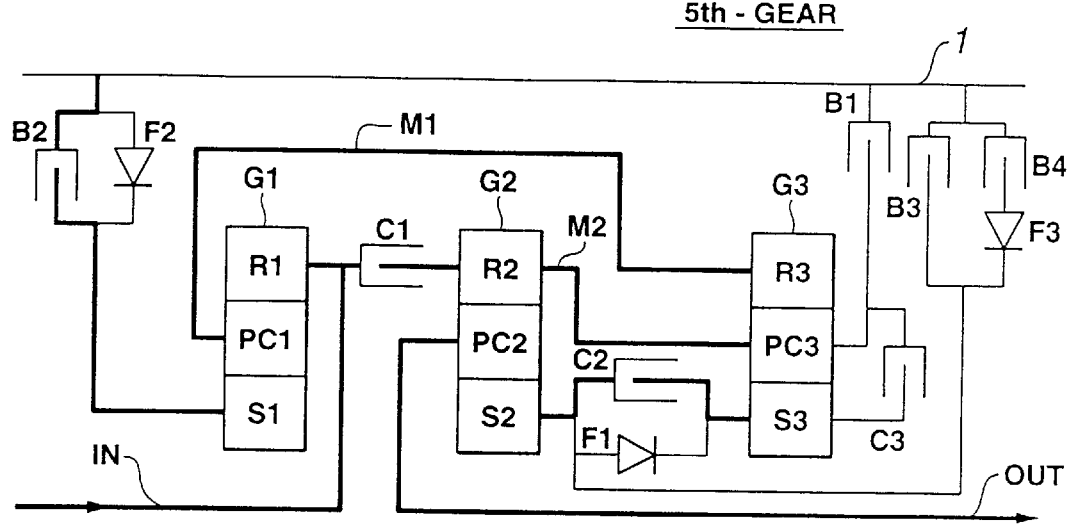
FIG. 8 is a view similar to FIG. 2, but showing a torque transmission path that is established when the automatic transmission assumes Fifth-Gear.
Figure 9:
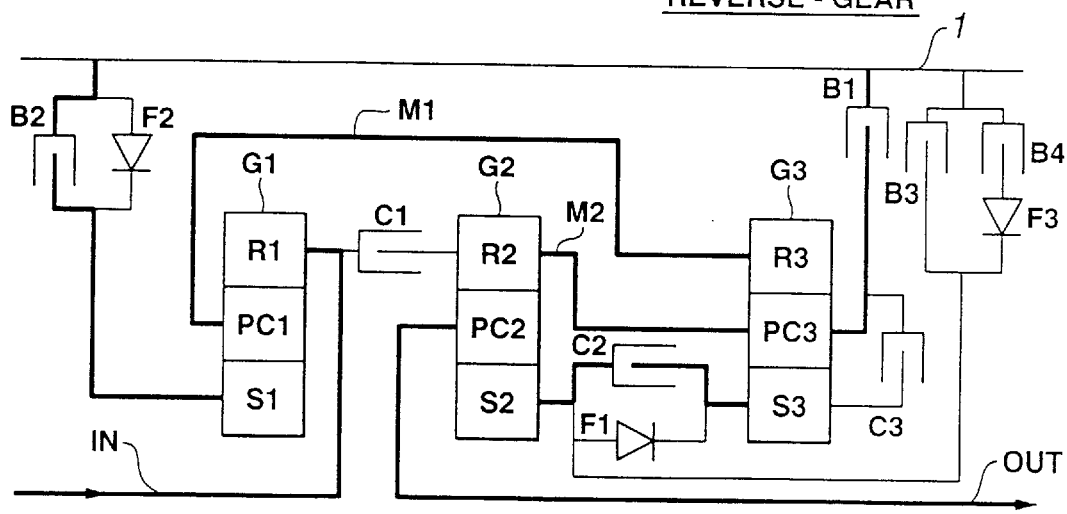
FIG. 9 is a view similar to FIG. 2, but showing a torque transmission path that is established when the automatic transmission assumes Reverse-Gear.

Referring to FIGS. 1 and 2, there is shown an automotive automatic transmission to which the present invention is practically applied.

In the drawings, particularly in FIG. 2, designated by references G1, G2 and G3 are first, second and third planetary gear units, designated by M1 and M2 are first and second connecting members, designated by C1, C2 and C3 are first, second and third clutches, designated by B1, B2, B3 and B4 are first, second, third and fourth brakes, designated by F1, F2 and F3 are first, second and third one-way clutches and designated by "IN" and "OUT" are input and output shafts respectively.

The first planetary gear unit G1 is of a single pinion type that comprises a first sun gear S1, a first ring gear R1, a first pinion (not shown) engaged with both the first sun gear S1 and the first ring gear R1 and a first pinion carrier PC1 carrying the first pinion.

The second planetary gear unit G2 is also of a single pinion type that comprises a second sun gear S2, a second ring gear R2, a second pinion (not shown) engaged with both the second sun gear S2 and the second ring gear R2 and a second pinion carrier PC2 carrying the second pinion.

The third planetary gear unit G3 is also of a single pinion type that comprises a third sun gear S3, a third ring gear R3, a third pinion (not shown) engaged with both the third sun gear S3 and the third ring gear R3 and a third pinion carrier PC3 carrying the third pinion.

The first connecting member M1 integrally connects the first pinion carrier PC1 and the third ring gear R3.

The second connecting member M2 integrally connects the second ring gear R2 and the third pinion carrier PC3.

The first clutch C1 selectively establishes connection or disconnection between the first ring gear R1 and the second ring gear R2.

The second clutch C2 selectively establishes connection or disconnection between the second sun gear S2 and the third sun gear S3. To this second clutch C2, there is connected the first one-way clutch F1 in parallel.

The third clutch C3 selectively establishes connection or disconnection between the third pinion carrier PC3 and the third sun gear S3.

The first brake B1 selectively brakes rotation of the second connecting member M2.

The second brake B2 selectively brakes rotation of the first sun gear S1. To this second brake B2, there is connected the second one-way clutch F2 in parallel.

The third brake B3 selectively brakes rotation of the second sun gear S2. To this third brake B3, there is connected in parallel a unit that includes the fourth brake B4 and the third one-way clutch F3 which are arranged in series as shown.

The input shaft IN is connected to the first ring gear R1, so that an engine torque is applied to the first ring gear R1 through a torque converter (not shown).

The output shaft OUT is connected to the second pinion carrier PC2, so that an output torque from the second pinion carrier PC2 is transmitted to drive wheels (not shown) through a final gear unit (not shown).

To the clutches C1, C2 and C3 and the brakes B1, B2, B3 and B4, there are connected a hydraulic pressure control device by which controlled engaging and releasing pressures for such friction elements are produced. The hydraulic pressure control device may be of a mechanically controlling type, an electronically controlling type or a combination of these two types.

FIG. 3 is a table showing various conditions taken by the various friction elements C1, C2, C3, B1, B2, B3, B4, F1, F2 and F3 when the automatic transmission assumes First, Second, Third, Fourth, Fifth and Reverse Gears.

In the table of FIG. 3, mark "Δ" represents that the corresponding friction element participates in torque transmission when assuming ON condition (viz., power ON), mark "C" represents that the corresponding friction element participates in torque transmission when the corresponding vehicle is under coasting, mark "●" represents that the corresponding friction element has no effect on the output of the transmission even when applied with a hydraulic pressure, mark "(○)" represents that the corresponding friction element takes an engaged condition under overrun mode, mark "(○)*" represents that the corresponding friction element assumes an engaged condition at the time when the corresponding gear (viz. first gear) is selected and thereafter the friction element takes a disengaged condition in a mode other than the overrun mode, and mark "○" represents that the corresponding friction element takes an engaged condition.

FIGS. 4 to 9 are schematic illustrations of power train showing respective torque transmission paths that are established when the automatic transmission assumes First, Second, Third, Fourth, Fifth and Reverse Gears.

Figure 10:
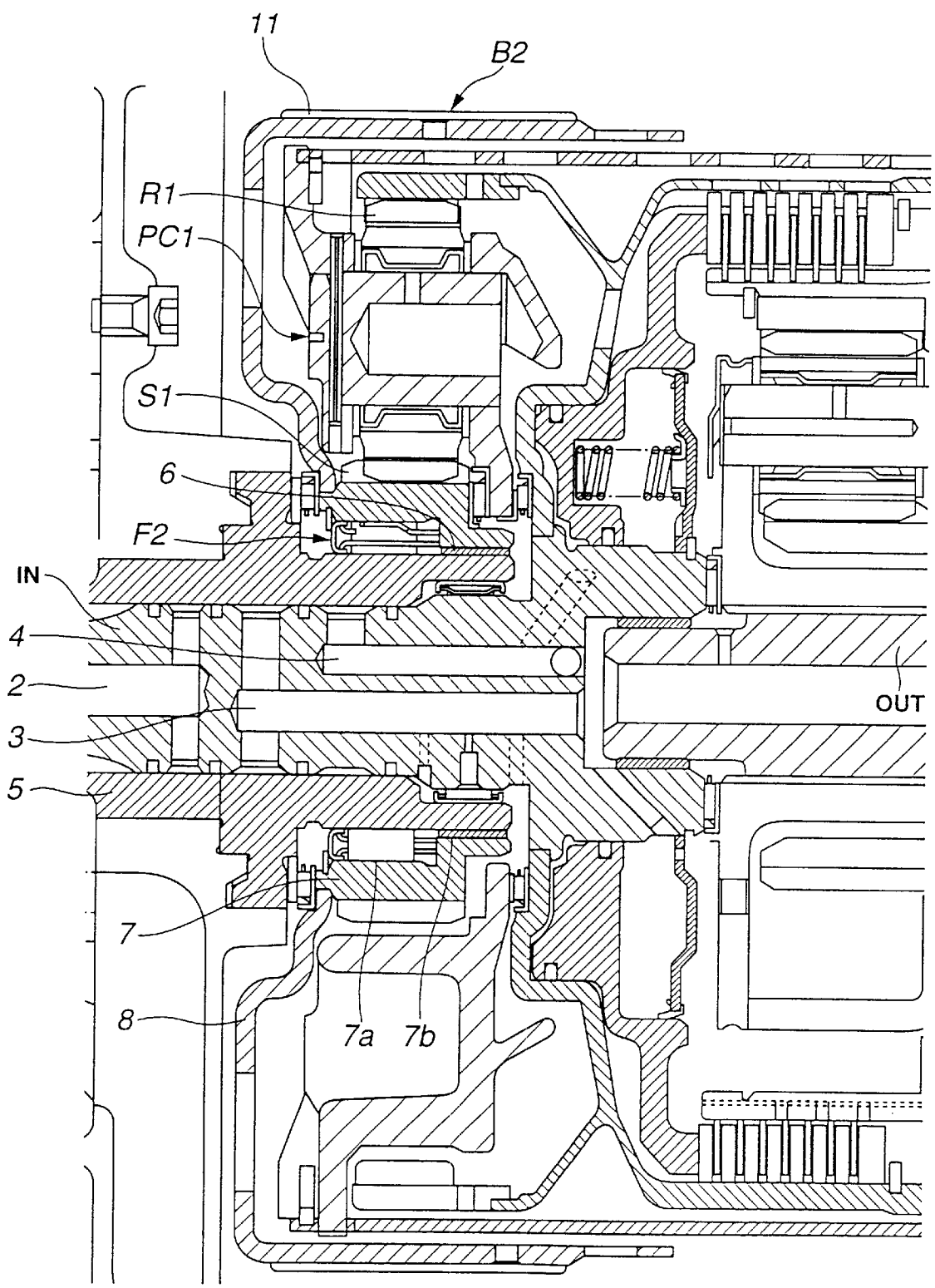
FIG. 10 is an enlarged sectional view of a portion of the automatic transmission where a second brake B2 (band brake type) is installed.

Referring to FIG. 10, there is shown the detail of a portion of the automatic transmission where the second brake B2 is installed. The second brake B2 is of a band brake type that comprises a brake drum 8 and a brake band 11. That is, when the band brake 11 is pressed against the brake drum 8, rotation of the brake drum 8 is braked.

In the drawing, denoted by numeral 5 is a shaft stator of an oil pump (not shown). Within the shaft stator 5, there is rotatably disposed a part of the input shaft IN of the transmission. Disposed about the shaft stator 5 is the second one-way clutch F2. An outer race 7 of the clutch F2 is supported on the shaft stator 5 through a bush 6.

As shown, the input shaft IN is formed with a hydraulic fluid passage 2 for feeding a hydraulic fluid to a lock-up clutch (not shown), a lubrication oil passage 3 for feeding lubrication oil to given portions and a hydraulic fluid passage 4 for feeding a hydraulic fluid to the clutch F2. As shown, the lubrication oil passage 3 and the hydraulic fluid passage 4 are eccentrically provided in the input shaft IN. Due to this eccentric arrangement of the passages 3 and 4, a torsional stress applied to the input shaft IN is evenly dispersed throughout the input shaft IN, and thus the shaft IN can exhibit a satisfied strength against the stress.

The outer race 7 of the second one-way clutch F2 has an outer race working face 7a and a band brake supporting face 7b. Around the clutch F2, there is arranged the first sun gear S1. As shown, the clutch F2 and the bush 6 are coaxially arranged for saving a mounting space thereof.

Figure 11:
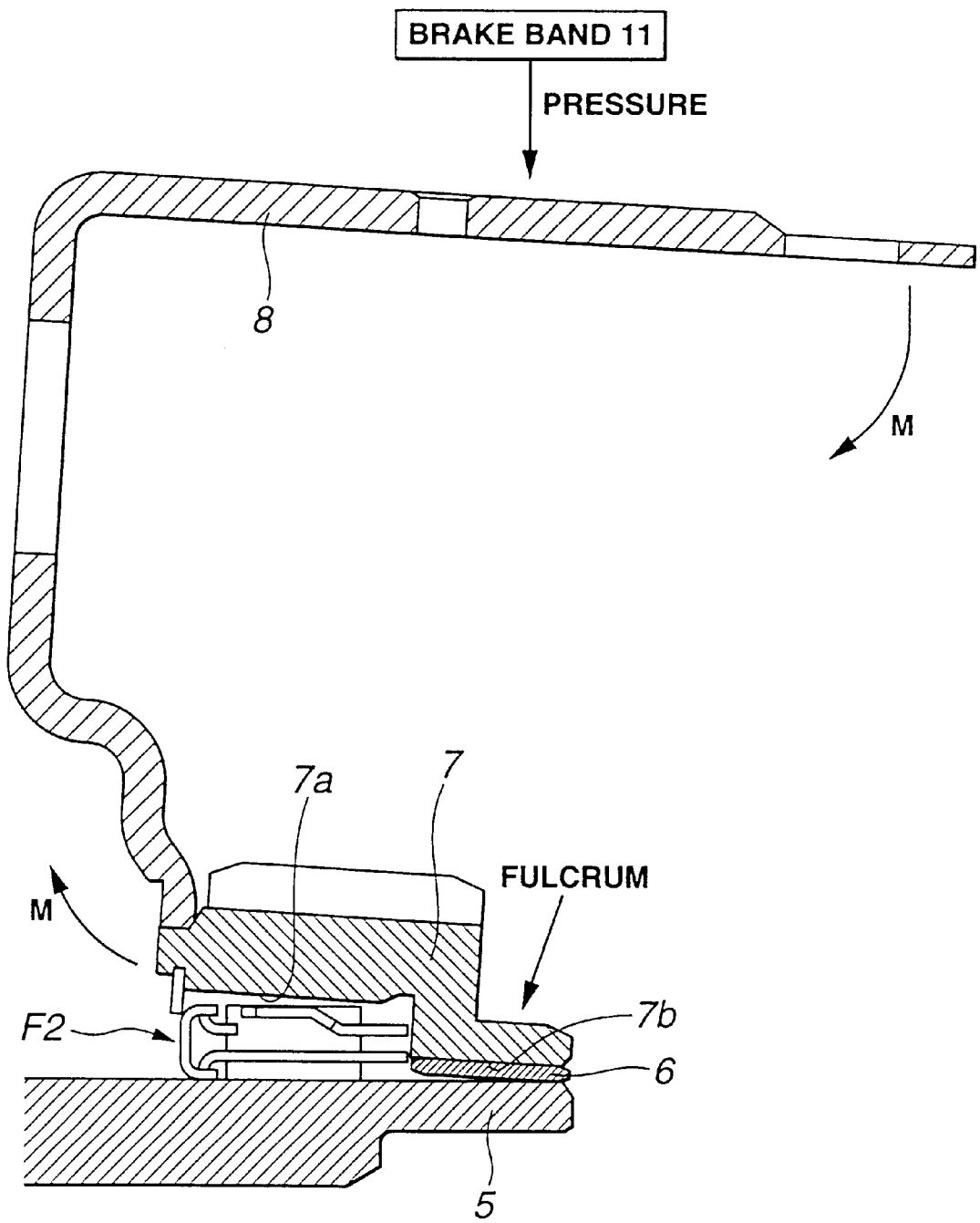
FIG. 11 is a sectional view of a brake drum off the second brake B2 and its associated parts in a condition wherein a brake pressure is applied to the brake drum by a brake band.

As is well shown in FIG. 11, to the outer race 7 of the second one-way clutch F2, there is connected an inner annular ridge of the brake drum 8 of the second brake B2. Thus, the outer race 7 and the brake drum 8 rotate together like a single unit. A measure is employed wherein the power point of the band brake 11 and the bush 6 are positioned on an imaginary plane that is perpendicular to the axis of the shaft stator 5. If, to the contrary, the power point and the bush 6 are not positioned on such imaginary plane, a drawback tends to occur wherein when, as is seen from FIG. 11, the brake drum 8 is pressed by the band brake 11, a certain moment M is produced using the bush 6 as a fulcrum and thus an excessive load is applied to the second clutch F2, which causes the clutch F2 to fail to have an assured lock condition. That is, rollover of the clutch F2 tends to occur. However, in the invention, due to the above-mentioned measure, such undesired rollover is suppressed.

Figure 12:
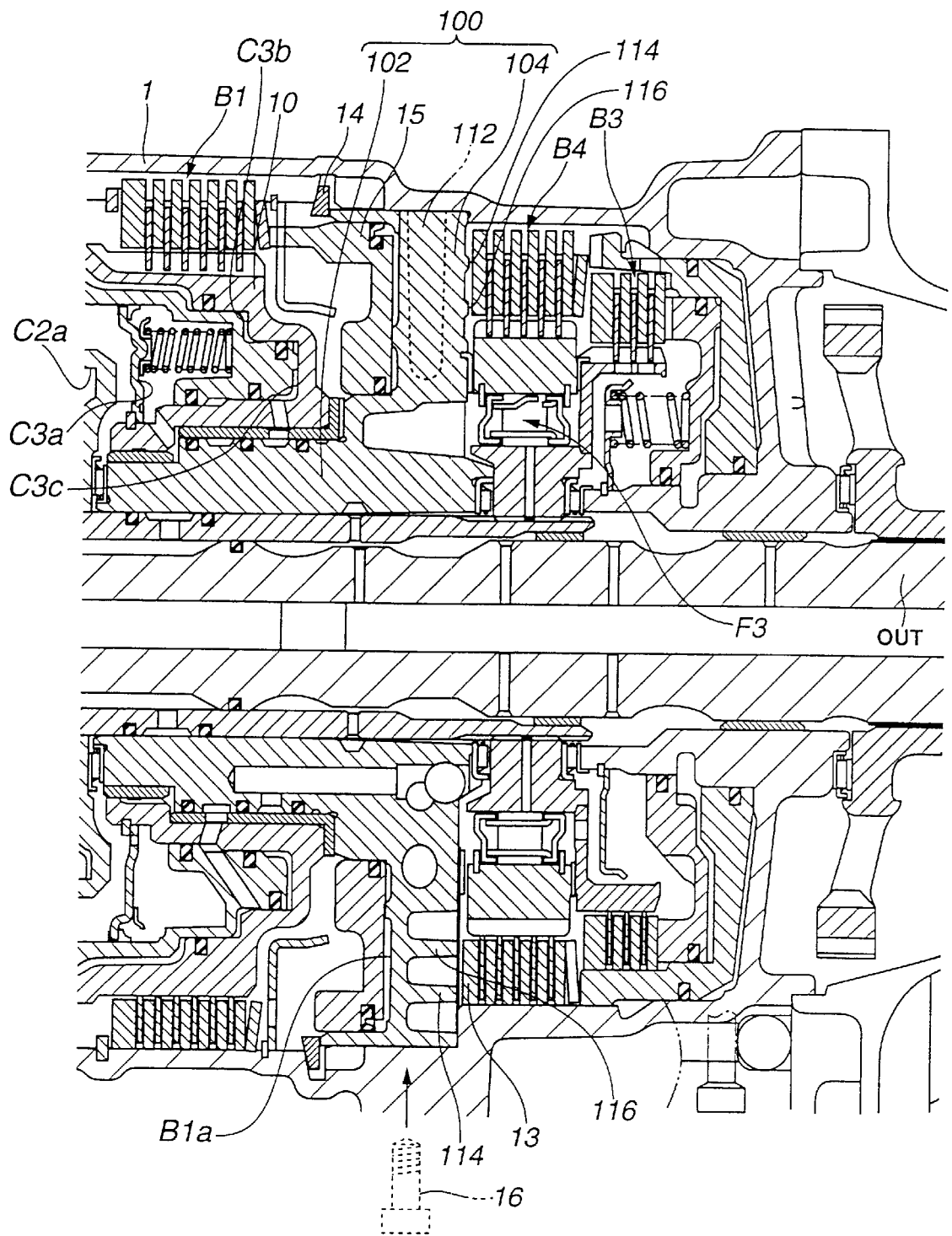
FIG. 12 is a sectional view of a portion of the automatic transmission where a drum supporting structure of the present invention is installed.

Referring to FIG. 12, there is shown the detail of a portion of the automatic transmission where a drum supporting structure of the present invention is practically arranged.

In the drawing, denoted by numeral 1 is a transmission case. A drum support 100 is immovably installed in the transmission case 1.

Figure 13:
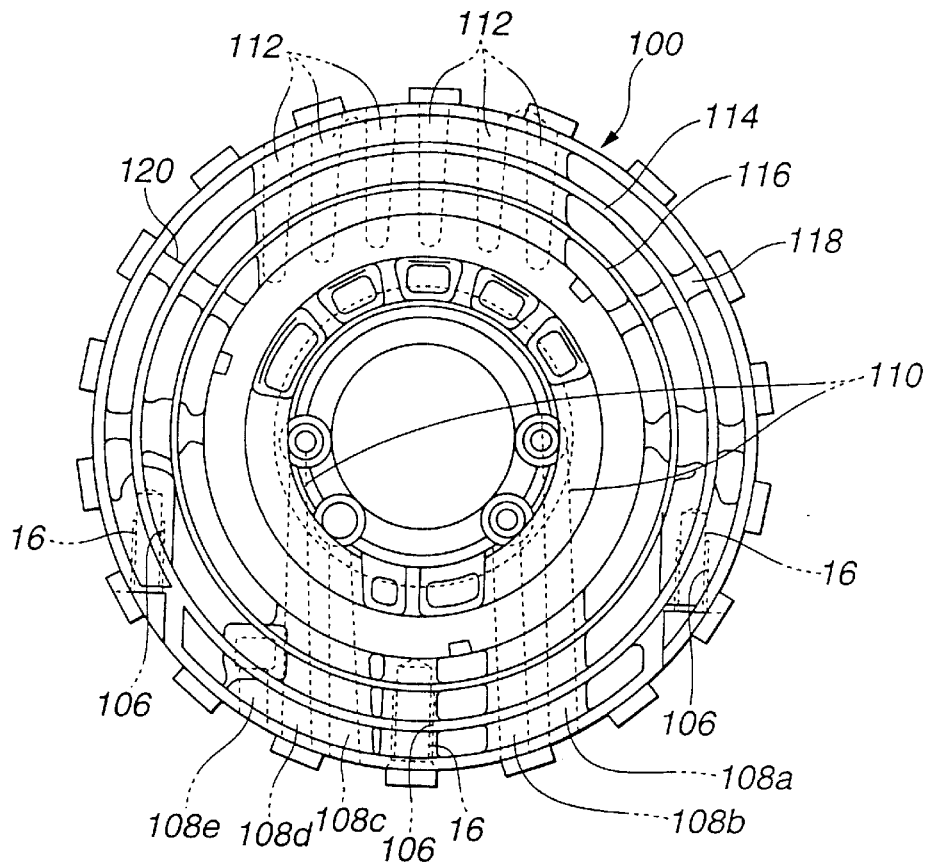
FIG. 13 is a rear view of a drum support used in the drum supporting structure of the invention, which is taken from the direction of a rear end of the transmission, that is, from the direction of the arrow XIII of FIG. 14.
Figure 14:
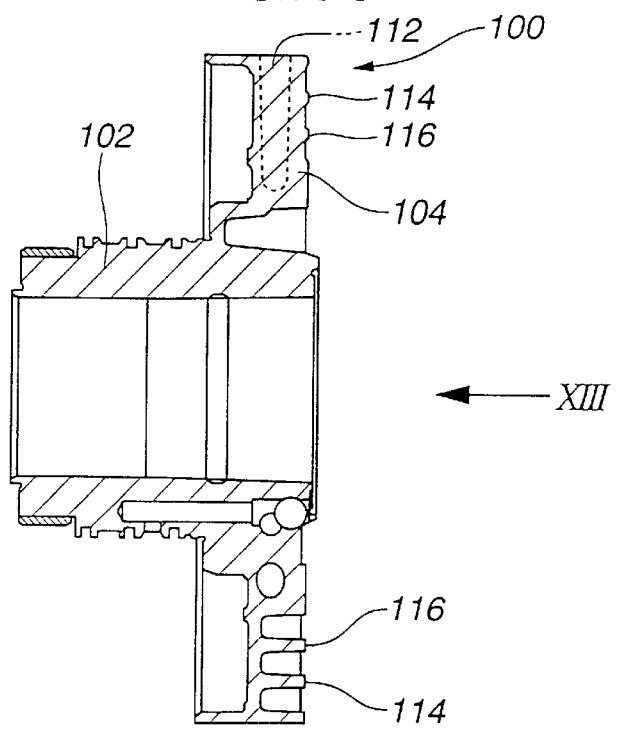
FIG. 14 is a sectional view of the drum support used in the drum supporting structure of the invention.
Figure 15:
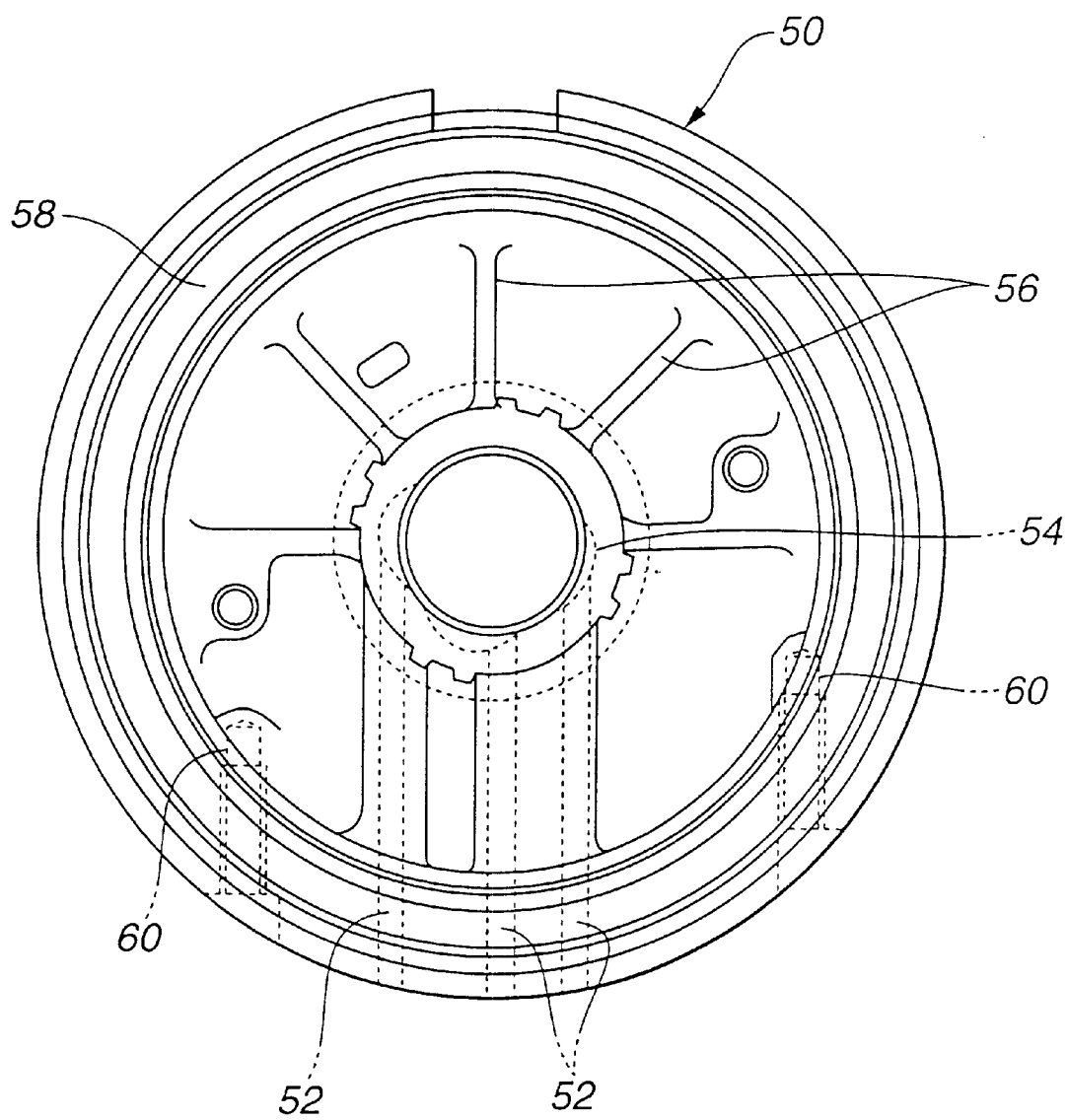
FIG. 15 is a rear view of a drum support used in a conventional drum supporting structure, which is taken from the direction of a rear end of the transmission.

As is seen from FIGS. 13 and 14, particularly from FIG. 14, the drum support 9 comprises a cylindrical hollow shaft portion 102 on which the drum 10 is rotatably disposed and a circular wall portion 104 which is coaxially and integrally formed on one end of the cylindrical hollow shaft portion 102.

For immovably installing the drum support 100 in the transmission case 1, a lower peripheral part of the circular wall portion 104 of the drum support 100 is secured to a lower portion of the transmission case 1 by means of bolts. That is, as is understood from FIG. 13, a plurality of bolts 16 passing through the lower portion of the transmission case 1 are screwed into bolt holes 106 formed in the circular wall portion 104 of the drum support 100.

Referring back to FIG. 12, a tapered snap ring 14 is installed in the transmission case 1 to suppress an axial play or displacement of the drum support 100. It is to be noted that circumferentially opposed ends of the tapered snap ring 14 are positioned at a lower portion of the transmission case 1 in the vicinity of the bolts 16 by which drum support 100 is secured to the lower portion of the transmission case 1. This is because the circumferentially opposed ends of the snap ring 14 have a poor resistance against a thrust loading applied thereto.

A drum 10 is rotatably held on the cylindrical hollow shaft portion 104 of the drum support 100. The drum support 100 has at a left side facing leftward in FIG. 12 a piston 15 of the first brake B1 slidably carried thereby. At a right side of the drum support 100, there are arranged the fourth brake B4 and the third one-way clutch F3. As shown, the circular wall portion 104 of the drum support 100 serves as a retaining member of the fourth brake B4. Behind the fourth brake B4, there is arranged the third brake B3.

In the present invention, the following unique measures are employed.

That is, as is seen from FIGS. 1, 12, 13 and 14, particularly from FIGS. 12 and 13, the drum support 100 has at a lower part of the circular wall portion 104 five hydraulic fluid passages 108a, 108b, 108c, 108d and 108e which extend vertically to axially extending hydraulic fluid passages 110 provided at a central portion of the drum support 100. That is, pressurized hydraulic fluid from a control unit C (see FIG. 1) flows into the fluid passages 108a, 108b, 108c, 108d and 108e and into the corresponding fluid passages 110. In fact, through the fluid passages 108a, 108b and 108c, the hydraulic fluid from the control unit C is led to a centrifugal force canceling chamber C3a, a larger fluid working chamber C3b and a smaller fluid working chamber C3c respectively, which are provided for a piston of the third clutch C3. Through the passage 108d, the hydraulic fluid is led to a fluid working chamber C2a provided for a piston of the second clutch C2 and through the passage 108e, the hydraulic fluid is led to a fluid working chamber B1a provided for a piston of the first brake B1.

The drum support 100 has further at an upper part of the circular wall portion 104 thereof six blind bores 112 which extend downward toward the central portion of the drum support 100. That is, the six blind bores 112 and the five hydraulic passages 108a, 108b, 108c, 108d and 108e are provided at diametrically opposed portions of the circular wall portion 104 of the drum support 100. In the illustrated embodiment, the six blind bores 112 and the five hydraulic passages 108a, 108b, 108c, 108d and 108e extend generally in parallel.

It is to be noted that, in the invention, the blind bores 112 extend toward the extension of the hydraulic fluid passages 108a, 108b, 108c, 108d and 108e, and the number of the blind bores 112 is at least the same as that of the hydraulic fluid passages 108a, 108b, 108c, 108d and 108e. These hydraulic fluid passages are symmetrically arranged with respect to a vertical plane that axially extends across the drum support 100.

The circular wall portion 104 of the drum support 100 has at a rear surface facing the fourth brake B4 two concentric annular ribs 114 and 116 and plurality of radially outwardly extending ribs 118 and 120. The two annular ribs 118 and 120 reinforce the wall of the circular wall portion 104 by which the six blind bores 112 and the five hydraulic fluid passages 108a, 108b, 108c, 108d and 108e are defined, and the radially outwardly extending ribs 118 and 120 reinforce the two annular ribs 114 and 116. As is understood from FIG. 12, the two annular ribs 114 and 116 contact a driven plate 13 of the fourth brake B4 when the drum support 100 actually serves as the retaining member of the fourth brake B4.

In the following, advantages of the present invention will be described with reference to the drawings.

As has been described hereinabove, the lower part of the circular wall portion 104 of the drum support 100, which is bolted to the lower portion of the transmission case 1, is formed with the five fluid passages 108a, 108b, 108c, 108d and 108e and the upper part of the circular wall portion 104 of the drum support 100 is formed with the six blind bores 112. The six blind bores 112 serve as a so-called "counterbalance" in rigidity against the five fluid passages 108a, 108b, 108c, 108d and 108e. That is, due to provision of the six blind bores 112, the rigidity of the upper part of the circular wall portion 104 is substantially equal to that of the lower part of the same. This arrangement provides the circular wall portion 104 and thus entirety of the drum support 100 with a well-balanced construction. Thus, undesired inclination of the circular wall portion 104 relative to the bolted lower part is suppressed or at least minimized.

As is seen from FIG. 12, in operation, the drum support 100 is applied with a certain thrust loading from the drum 10, the piston 15 of the first brake B1 and/or the fourth brake B4. However, due to the well balanced construction possessed by the circular wall portion 104, the inclination of the circular wall portion 104 is suppressed.

Due to provision of the two annular ribs 114 and 116 reinforced by the radial ribs 118 and 120, the upper and lower portions of the circular wall portion 104 where the blind bores 112 and the fluid passages 108a, 108b, 108c, 108d and 108e are provided are reinforced. Thus, the circular wall portion 104 can reliably and assuredly support the driven plate 13 of the fourth brake B4.

Provision of the six blind bores 112 in the circular wall portion 104 reduces the weight of the drum support 100, which is effective to lighten the transmission.

The entire contents of Japanese Patent Application 11-296508 (filed Oct. 19, 1999) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. In an automatic transmission including a transmission case, a drum rotatably installed in said transmission case and a friction element incorporated with said drum, a drum supporting structure comprising:

a drum support immovably installed in said transmission case, said drum support including a cylindrical hollow shaft portion on which said drum is rotatably disposed and a circular wall portion which is concentrically and integrally formed on one end of the cylindrical hollow shaft portion;

a first part of said circular wall portion, said first part being secured to said transmission case and having a plurality of hydraulic fluid passages defined therein; and a second part of said circular wall portion, said second part having a plurality of blind bores defined therein, the number of said blind bores being at least the same as that of the hydraulic fluid passages, said first and second parts being provided at diametrically opposed portions of said circular wall portion and said blind bores extending toward the extension of said hydraulic fluid passages.

2. A drum supporting structure as claimed in claim 1, in which said circular wall portion of said drum support is formed with concentric annular ribs for reinforcing the structures of said first and second parts.

3. A drum supporting structure as claimed in claim 2, in which said circular wall portion of said drum support is formed with radially outwardly extending ribs for reinforcing said annular ribs.

4. A drum supporting structure as claimed in claim 1, in which said hydraulic fluid passages of said first part and said blind bores of said second part extend generally in parallel.

5. A drum supporting structure as claimed in claim 1, in which said first part of said circular wall portion is secured to said transmission case through bolts.

6. A drum supporting structure as claimed in claim 2, in which said annular ribs of said circular wall portion are arranged and sized to serve as a retaining member for another friction element that is coaxially arranged behind said drum support.

7. In an automatic transmission including a transmission case, an output shaft rotatably installed said transmission case, a drum rotatably disposed around said output shaft, a first friction element incorporated with said drum and a second friction element arranged behind said drum, a drum supporting structure comprising:

a drum support immovably installed in said transmission case and having a through bore through which said output shaft passes, said drum support including a cylindrical hollow shaft portion on which said drum is rotatably disposed and a circular wall portion which is concentrically and integrally formed on one end of said cylindrical hollow shaft portion, said circular wall portion having a rear surface that faces said second friction element;

a first part of said circular wall portion, said first part being bolted to said transmission case and having a plurality of hydraulic fluid passages defined therein; and a second part of said circular wall portion, said second part having a plurality of blind bores defined therein, the number of said blind bores being at least the same as that of said hydraulic fluid passages, said first and second parts being provided at diametrically opposed portions of said circular wall portion and said blind bores extending toward the extension of said hydraulic fluid passages.

* * * * *